(12) United States Patent
Deperro et al.

(10) Patent No.: US 10,783,582 B2
(45) Date of Patent: Sep. 22, 2020

(54) SYSTEMS AND METHODS FOR PROVIDING REAL-TIME MONITORING OF SPENDING LIMITS

(71) Applicant: CAPITAL ONE SERVICES, LLC, McLean, VA (US)

(72) Inventors: Jason Deperro, Burlingame, CA (US); Matthew Stern, San Francisco, CA (US); Daniel Makoski, Palo Alto, CA (US); Makiko Taniguchi, San Francisco, CA (US); Austin Anderson, San Francisco, CA (US); Carl Cepress, Oakland, CA (US)

(73) Assignee: Capital One Services, LLC, McLean, VA (US)

(*) Notice: Subject to any disclaimer, the term of this patent is extended or adjusted under 35 U.S.C. 154(b) by 675 days.

(21) Appl. No.: 14/974,322

(22) Filed: Dec. 18, 2015

(65) Prior Publication Data

US 2016/0180465 A1 Jun. 23, 2016

Related U.S. Application Data

(60) Provisional application No. 62/094,747, filed on Dec. 19, 2014.

(51) Int. Cl.
*G06Q 40/06* (2012.01)
*G06Q 50/00* (2012.01)

(52) U.S. Cl.
CPC .......... *G06Q 40/06* (2013.01); *G06Q 50/01* (2013.01)

(58) Field of Classification Search
USPC ................................................ 705/36, 36 R
See application file for complete search history.

(56) References Cited

U.S. PATENT DOCUMENTS

| | | | | |
|---|---|---|---|---|
| 8,301,501 | B1* | 10/2012 | Glaeser | G06Q 20/20 705/17 |
| 2013/0030925 | A1* | 1/2013 | Calman | G06Q 30/02 705/14.66 |
| 2015/0278829 | A1* | 10/2015 | Lu | H04L 67/20 705/7.29 |

OTHER PUBLICATIONS

Braswell et al. "Enabling the On-Demand Store with IBM Store Integration Framework". An IBM Redbook publication—SG24-6698-02. ISBN 9780738489896. (Year: 2007) Abstract only provided as attached.*

(Continued)

*Primary Examiner* — Lindsay M Maguire
*Assistant Examiner* — Ambreen A. Alladin
(74) *Attorney, Agent, or Firm* — Finnegan, Henderson, Farabow, Garrett & Dunner

(57) ABSTRACT

In one embodiment, a server is provided for providing real-time monitoring of spending limits. The server may include memory storing software instructions, and a processor(s) configured to execute the software instructions to perform operations. The operations may include determining that a user has interacted with a store item in a retail environment. The operations may also include accessing a user profile of the user that includes a savings goal of the user, and determining that purchase of the store item would meet at least one trigger condition associated with the savings goal. The operations may further include generating an analysis of the estimated impact of the purchase to the savings goal, and providing the analysis to a device for display to the user while the user remains within the retail environment.

14 Claims, 10 Drawing Sheets

(56) References Cited

OTHER PUBLICATIONS

Nandwani et al. "Contactless check-ins using implied locations: An NFC solution simplifying business to consumer interaction in location based services". IEEE. 2012 IEEE International Conference on Electronics Design, Systems and Applications, Abstract provided as attached ISBN: 978-1-4673-2163-1) (Year: 2012).*

* cited by examiner

USER ENTERING STORE
MONITORING PROCESS 800

SYSTEMS AND METHODS FOR PROVIDING REAL-TIME MONITORING OF SPENDING LIMITS

PRIORITY

This application claims priority to U.S. Provisional Application No. 62/094,747 filed Dec. 19, 2014, the disclosure of which is hereby incorporated by reference in its entirety.

BACKGROUND

Typical budget and money management systems allow users to view their savings goals and current spending habits, but these systems offer only high-level goals and insights after users have already made their spending decisions. For example, current systems allow a user to review their past purchases from the previous billing cycle of expenses, and the category of spending those purchases fell into, but only in the context of how past purchases have affected the user's savings goals.

Current systems do not provide a user with personalized budgeting advice at a time when receiving the advice could alter spending priorities while the user remains within a retailer environment, before making a purchase. For example, current systems cannot provide a user with real-time analyses estimating the impact that a purchase of a store item the user has "in hand" at the store would have on the user's financial goals, while the user is still holding onto the store item. Current systems also fail to provide analyses in a context that allows the user to make decisions in the context of the user's desired lifestyle. For example, current systems do not provide users with personalized cost metaphors or suggest a future purchase that the user typically makes but could forgo in order to purchase the item "in hand" while still achieving the user's savings goals.

Current computing systems and supporting infrastructures are ill-equipped to address these and similar issues. Therefore, the computing systems disclosed herein are directed towards, among other things, providing financial analyses to users in real-time to allow a user to consider, before making a purchase, what impact making the purchase would have on the user's savings goals.

SUMMARY

Disclosed embodiments include methods, systems, and computer-readable media configured to, for example, provide real-time monitoring of spending limits. The disclosed embodiments may be configured to provide users the ability to consider the impact of a purchase to the user's savings goals before making the purchase. Disclosed embodiments may further provide an analysis to the user of the estimated impact of a purchase to the user's savings goals, as well as suggestions for lessening and/or avoiding the estimated impact if the user makes the purchase.

The disclosed embodiments may also include a server for providing real-time monitoring of spending limits. The server may comprise a memory storing software instructions, the software instructions including an application configured to perform operations. The server may also include one or more processors configured to execute the software instructions to perform operations. The operations may include determining a user has interacted with a store item within a retail environment. The operations may further include accessing a user profile of the user, the user profile including at least one savings goal of the user, and determining that a purchase of the store item would meet at least one trigger condition from among a plurality of trigger conditions associated with the at least one savings goal. The operations may also include generating an analysis of the estimated impact of the purchase on the at least one savings goal, and providing the analysis to a device for display to the user while the user remains within the retail environment.

Aspects of the disclosed embodiments may include tangible computer-readable media that stores software instructions that, when executed by one or more processors, are configured to and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

Figure 1:
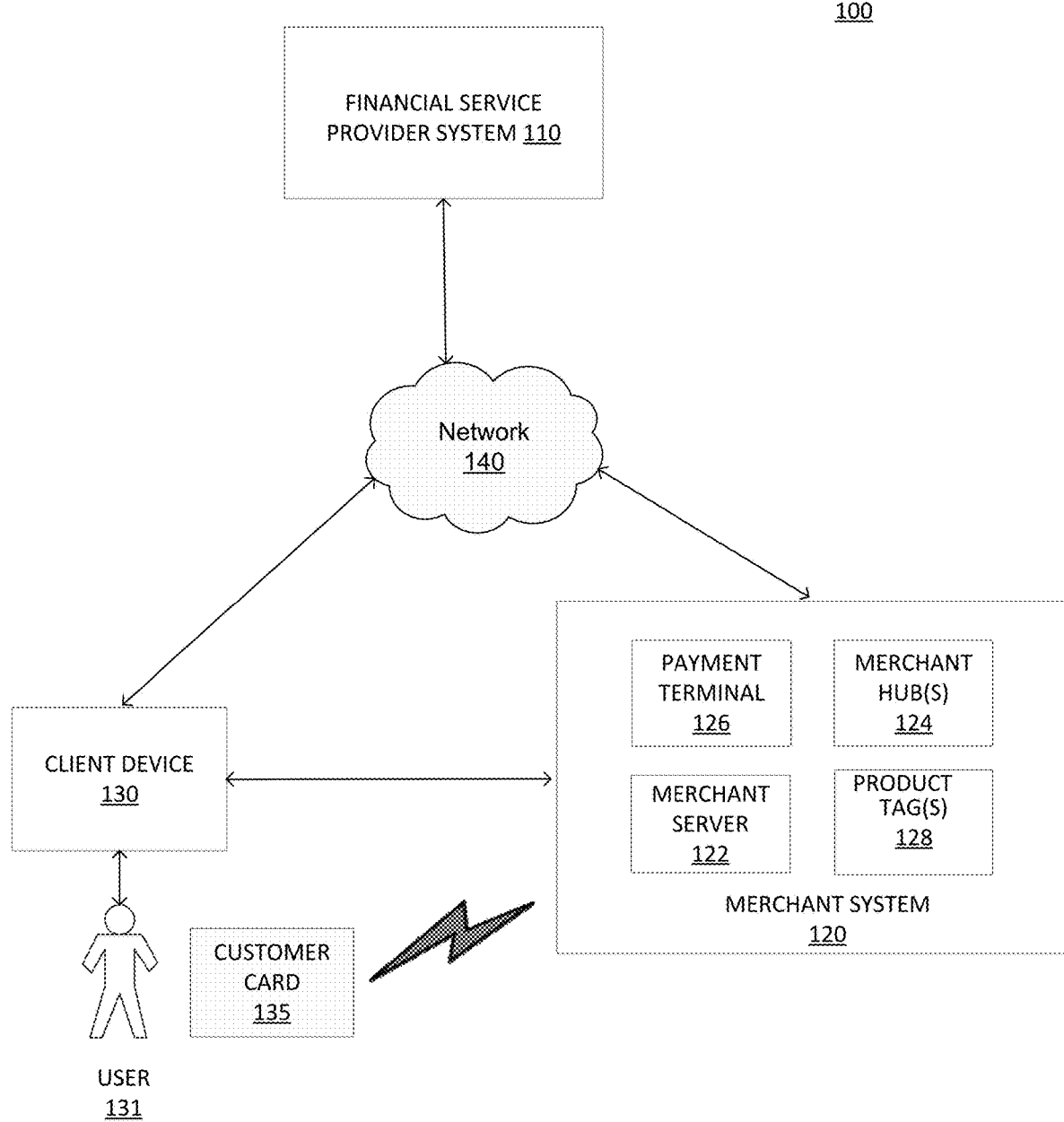
FIG. 1 is a block diagram of an exemplary system, consistent with disclosed embodiments.

FIG. 1 is a block diagram of an exemplary system 100 for performing one or more operations consistent with the disclosed embodiments. In one embodiment, system 100 may include one or more financial service provider (FSP) systems 110, one or more merchant systems 120, one or more client devices 130, one or more customer cards 135, and network 140. The components and arrangement of the components included in system 100 may vary. Thus, system 100 may include other components that perform or assist in the performance of one or more processes consistent with the disclosed embodiments.

Components of system 100 may be configured to provide real-time monitoring of spending limits, consistent with disclosed embodiments. As further described herein, merchant system 120 may track the location of a user 131 (e.g., by tracking the location of customer card 135 carried by user 131) and report a customer's interaction with a store item of the merchants to FSP 110. FSP 110 may access a user profile of user 131 and provide the user with an analysis (e.g., by sending the analysis for display on client device 130 operated by user 131) of whether purchasing the store item is consistent with the user's short- and/or long-term savings goals.

Components of system 100 may include one or more computing devices (e.g., computer(s), server(s), etc.), memory storing data and/or software instructions (e.g., database(s), memory devices, etc.), and other known computing components. In some embodiments, the one or more computing devices may be configured to execute software instructions stored on one or more memory devices to perform one or more operations consistent with the disclosed embodiments. Other components of system 100, such as product tag(s) 128 and customer card 135, may include passive components having no internal power source. FSP system(s) 110, merchant system(s) 120, and client(s) 130 may be configured to communicate with one or more other components of system 100. In certain aspects, users may operate one or more components of system 100 to receive communications, initiate operations, and/or provide input for one or more operations consistent with the disclosed embodiments.

FSP system 110 may be associated with a financial service entity that provides, maintains, manages, or otherwise offers financial services. For example, the financial service entity may be a bank, credit card issuer, or any other type of financial service entity that generates, provides, manages, and/or maintains financial service accounts for one or more users. Financial service accounts may include, for example, credit card accounts, loan accounts, checking accounts, savings accounts, reward or loyalty program accounts, and/or any other type of financial service account known to those skilled in the art. FSP system 110 may include infrastructure and components that are configured to generate and/or provide financial service accounts such as credit card accounts, checking accounts, debit card accounts, loyalty or reward programs, lines of credit, and the like.

In one aspect, FSP system 110 may be one or more computing devices configured to perform one or more operations consistent with disclosed embodiments. In one aspect, FSP system 110 may be one or more servers. FSP system 110 may include one or more processors configured to execute software instructions stored in memory. The one or more processors may be configured to execute software instructions that, when executed by a processor, performs Internet-related communication, financial service-based processes, and/or spending limit monitoring processes. For instance, FSP system 110 may execute software that provides data used for generating and displaying interfaces, including content for a display device included in, or connected to, client device 130. In some embodiments, financial service provider 110 may provide one or more web sites or online portals that are accessible by client device 130 and/or merchant system 120 over network 140. The disclosed embodiments are not limited to any particular configuration of FSP system 110.

Merchant system 120 may be an entity that offers goods, services, and/or information, such as a retailer (e.g., Macy's®, Target®, etc.), grocery store, or any other type of entity that offers goods and/or services that consumers may purchase. In one example, merchant system 120 may be associated with a merchant brick and mortar location(s) that a consumer (e.g., a user of client device 130) may physically visit to purchase a product or service. Merchant system 120 may also include back- and/or front-end computing components that store data and execute software instructions to perform operations consistent with disclosed embodiments, such as computers that are operated by employees of the merchant (e.g., back office systems, etc.).

Merchant system 120 may include one or more merchant servers 122, payment terminals 126, merchant hubs 124, and product tags 128. Merchant servers 122 may include one or more computing systems configured to execute stored software instructions to perform operations associated with a merchant, including one or more processes associated with processing purchase transactions, generating transaction data, generating product data (e.g., SKU data) relating to purchase transactions, etc.

Merchant hub(s) 124 may include one or more computing systems configured to execute stored software instructions to perform operations associated with monitoring customer interactions with store items within a merchant store. For example, merchant hub(s) 124 may be configured to monitor the location of customer card 135 carried by user 131 and product tag(s) 128 affixed to store items within a merchant store and determine when a customer has interacted with the store item, such as by picking up the store item.

Payment terminal 126 may be one or more computing devices configured to perform one or more operations consistent with conducting sales transactions associated with merchant system 120. For example, payment terminal 126 may comprise one or more point-of-sale (POS) terminals configured to accept payment from user 131 associated with the sale of a merchant store item.

Product tag(s) 128 may comprise one or more components detectable by merchant hub(s) 124 that may be affixed to store items. For example, product tag(s) 128 may comprise a label that includes technology to allow merchant hub(s) 124 to track the location of the product tag(s) 128 within a retail environment including technology associated with using, for example, near field communication (NFC), RFID, infrared, electric fields, magnetic fields, WiFi, Bluetooth, etc. In some embodiments, product tag(s) 128 may be a passive, low-power device having no internal power source.

Client device 130 may be one or more computing devices configured to perform one or more operations consistent with disclosed embodiments. In some embodiments, client device 130 may be a mobile device (e.g., tablet, smart phone, etc.). Client device 130 may include one or more processors configured to execute software instructions stored in memory, such as memory included in client device 130. Client device 130 may include software that when executed by a processor performs known Internet-related communication, content display processes, and financial service-related processes for a user of client device 130. For instance, client device 130 may execute browser or related mobile display software that generates and displays interfaces including content on a display device included in, or in communication with, client device 130. Client device 130 may be a mobile device that executes mobile device applications and/or mobile device communication software that allows client device 130 to communicate with components over network 140, and generates and displays content in interfaces via a display device included in client device 130. The disclosed embodiments are not limited to any particular configuration of client device 130. For instance, client device 130 may be a mobile device that stores and executes mobile applications that provide financial service-related functions offered by the financial service entity associated with FSP system 110, such as a mobile banking application for checking balances, paying bills, performing financial transactions, budgeting, receiving marketing messages, etc.

Customer card 135 may comprise a financial services product associated with financial service accounts of user 131, such as a financial card, key fob, smartcard, etc. For example, customer card 135 may comprise a credit card, debit card, or any other financial card associated with conducting financial transactions. In some embodiments, customer card 135 may comprise a digital wallet such that, for example, client device 130 is customer card 135. In some embodiments, customer card 135 may include technology to allow merchant hub(s) 124 to track the location of the customer card 135 within a retail environment including technology associated with using, for example, near field communication (NFC), RFID, infrared, electric fields, magnetic fields, WiFi, Bluetooth, etc. In other embodiments, a component may be affixed to customer card 135 in order to allow merchant hub(s) 124 to track the location of the customer card 135 within a retail environment. In some embodiments, customer card 135 may be a passive, low-power device having no internal power source.

Network 140 may be any type of network configured to provide communications between components of system 100. For example, network 140 may be any type of network (including infrastructure) that provides communications, exchanges information, and/or facilitates the exchange of information, such as the Internet, a Local Area Network, NFC, Optical code scanner, or other suitable connection(s) that enables the sending and receiving of information between the components of system 100. In other embodiments, one or more components of system 100 may communicate directly through a dedicated communication link(s).

It is to be understood that the configuration and boundaries of the functional building blocks of system 100 have been defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 2:
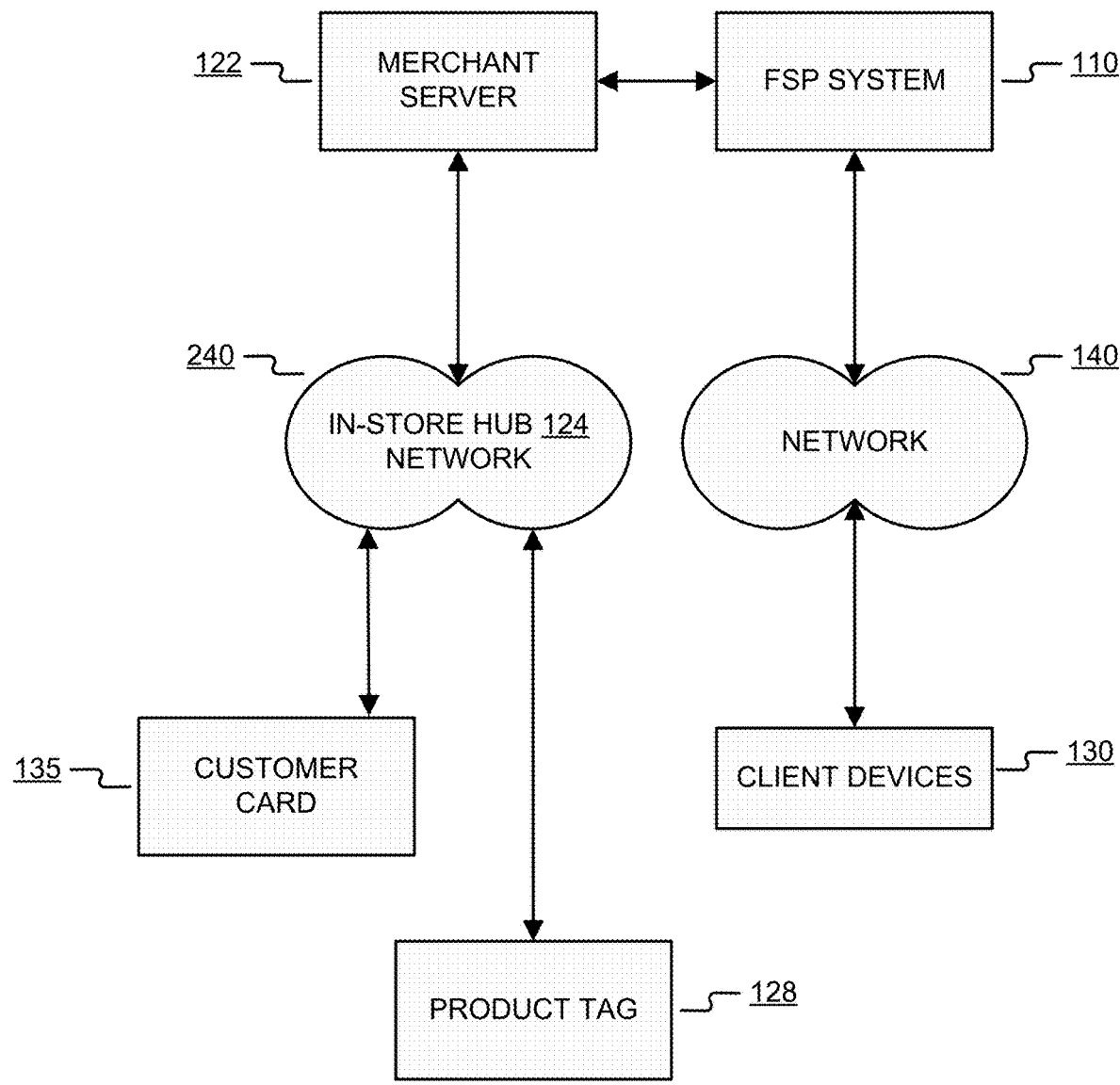
FIG. 2 is an exemplary network architecture, consistent with disclosed embodiments.

FIG. 2 shows an exemplary network architecture, consistent with disclosed embodiments. As further described herein, merchant system 120 may track the location of a user (e.g., by tracking the location of customer card 135 carried by user 131) and a plurality of store items 123 (e.g., by tracking the location of product tags 128 affixed to store items 123). For example, merchant system 120 may comprise one or more hubs 124 that communicate with and/or track the location of customer card 135 and product tags 128 over an in-store hub network 240 generated by the one or more hubs 124. In-store network 240 may comprise near field communication (NFC), RFID, infrared, electric fields, magnetic fields, WiFi, Bluetooth, or any other wireless technology suitable for performing operations consistent with disclosed embodiments. Hub(s) 124 may determine that a customer has interacted with a store item 123 when customer card 135 and a product tag 128 become linked. In one example, hub(s) 124 may determine customer card 135 and a product tags 128 are linked based on a determination that customer card 135 and product tag 128 are within a predetermined proximity of each other. For example, hub(s) 124 may determine that customer card 135 and product tag 128 are within 10 inches of each other, indicating that the user has picked up store item 123. In other examples, hub(s) 124 may generate an electrical field, and hub(s) 124 may determine customer card 135 and product tag 128 are linked based on changes to the electrical field with respect to customer card 135 and store item 123 caused by user 131 touching store item 123. According to some embodiments, hub(s) 124 may communicate with merchant server 122 over a Local Area Network (LAN) or direct connection separate from in-store hub network 240.

Upon a determination that user 131 has interacted with store item 123, hub(s) 124 may transmit information associated with customer card 135 and store item 123 (identified by merchant system 120 from product tag 128) to FSP system 110 via, e.g., merchant server 122. FSP system 110 may identify user 131 based on the customer card 135 information and access a user profile of user 131 associated with customer card 135 to identify one or more savings goals of the user. As discussed more fully herein, FSP system 110 may also conduct an analysis of whether the purchase of store item 123 is consistent with the one or more savings goals of the user.

FSP system 110 may also provide the analysis to client device 130 in real-time such that user 131 is provided the analysis in time for user 131 to consider, before making a purchase, what impact purchasing store item 123 would have to the one or more savings goals. FSP system 110 may provide the analysis to client device 130 over network 140 according to the user's communication preferences, which may be indicated in the user profile of user 131. For example, user 131 may prefer to receive budget analyses via SMS messages at the user's cellular phone (client device 130, in this example), and FSP 110 may provide the analysis to the user's cellular phone over a cellular network (network 140, in this example).

Figure 3:
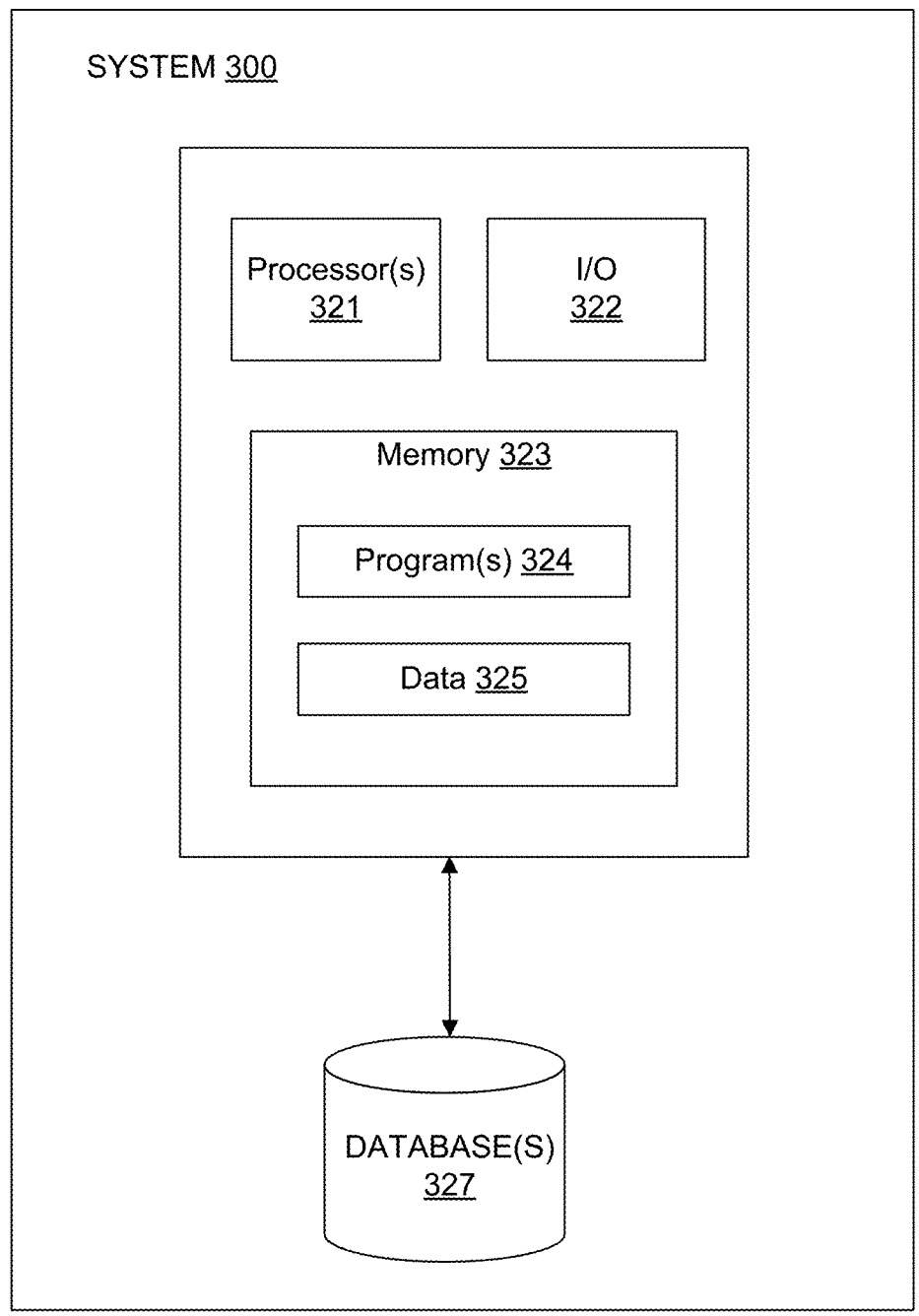
FIG. 3 is a diagram of another exemplary system, consistent with disclosed embodiments.

FIG. 3 shows an exemplary system 300 consistent with disclosed embodiments. Variations of exemplary system 300 may be one or more components of FSP system 110, merchant system 120, and/or client device 130. In one embodiment, system 300 may comprise one or more processors 321, one or more input/output (I/O) devices 322, and one or more memories 323. In some embodiments, system 300 may take the form of a server, general purpose computer, mainframe computer, or any combination of these components. In some embodiments, system 300 may take the form of a mobile computing device (e.g., client device 130) such as a smartphone, tablet, laptop computer, or any combination of these components. Alternatively, system 300 may be configured as a particular apparatus, embedded system, dedicated circuit, and the like based on the storage, execution, and/or implementation of the software instructions that perform one or more operations consistent with the disclosed embodiments.

Processor 321 may include one or more known processing devices, such as a microprocessor from the Pentium™ or Xeon™ family manufactured by Intel™, the Turion™ family manufactured by AMD™ or any of various processors manufactured by Sun Microsystems. The disclosed embodiments are not limited to any type of processor(s) otherwise configured to meet the computing demands required of different components of system 100. For example, processor 321 may also include one or more mobile device microprocessors when a variation of system 300 is client device 130.

Memory 323 may include one or more storage devices configured to store instructions used by processor 321 to perform functions related to disclosed embodiments. For example, memory 323 may be configured with one or more software instructions, such as program(s) 324 that may perform one or more operations when executed by processor 321. The disclosed embodiments are not limited to separate programs or computers configured to perform dedicated tasks. For example, memory 323 may include a single program 324 that performs the functions of system 300, or program 324 may comprise multiple programs. Memory 323 may also store data 325 that is used by one or more programs 324.

In certain embodiments, memory 323 may store software associated with providing real-time monitoring of spending limits that may be executed by processor(s) 321 to perform one or more communication and/or analysis processes consistent with disclosed embodiments. For example, the software may be run by a FSP system 110, merchant system 120, and/or client device 130 to provide a private label financial account held by a consumer.

I/O devices 322 may be one or more devices configured to allow data to be received and/or transmitted by system 300. I/O devices 322 may include one or more digital and/or analog devices that allow system 300 to communicate with and/or detect other machines and devices, such as other components of system 100. For example, when system 300 is FSP system 110 or merchant system 120, I/O devices 322 may include a network controller and/or wireless adaptor for communicating over the Internet. Further, in some embodiments, merchant system 120 may include one or more hubs 124 having I/O devices 322 configured to generate an electric field for tracking the location of and/or communicating with customer card(s) 135 and product tag(s) 128.

In some embodiments, I/O devices 322 may include a screen for displaying an interface. I/O devices 322 may also include one or more digital and/or analog devices that allow a user to interact with system 300 such as a touch-sensitive area, keyboard, buttons, or microphones. I/O devices 322 may also include other components known in the art for interacting with a user.

The components of system 300 may be implemented in hardware, software, or a combination of both hardware and software, as will be apparent to those skilled in the art. For example, although one or more components of system 300 may be implemented as computer processing instructions, all or a portion of the functionality of system 300 may be implemented instead in dedicated electronics hardware.

System 300 may also be communicatively connected to one or more database(s) 327. System 300 may be communicatively connected to database(s) 327 through network 140. Database 327 may include one or more memory devices that store information and are accessed and/or managed through system 300. By way of example, database(s) 327 may include Oracle™ databases, Sybase™ databases, or other relational databases or non-relational databases, such as Hadoop sequence files, HBase, or Cassandra. The databases or other files may include, for example, data and information related to the user profiles, savings goals, trigger conditions associated with those savings goals, financial records, purchase transaction data, consumer demographics information, etc. Systems and methods of disclosed embodiments, however, are not limited to separate databases. In one aspect, system 300 may include database 327. Alternatively, database 327 may be located remotely from the system 300. Database 327 may include computing components (e.g., database management system, database server, etc.) configured to receive and process requests for data stored in memory devices of database(s) 327 and to provide data from database 327.

Figure 4:
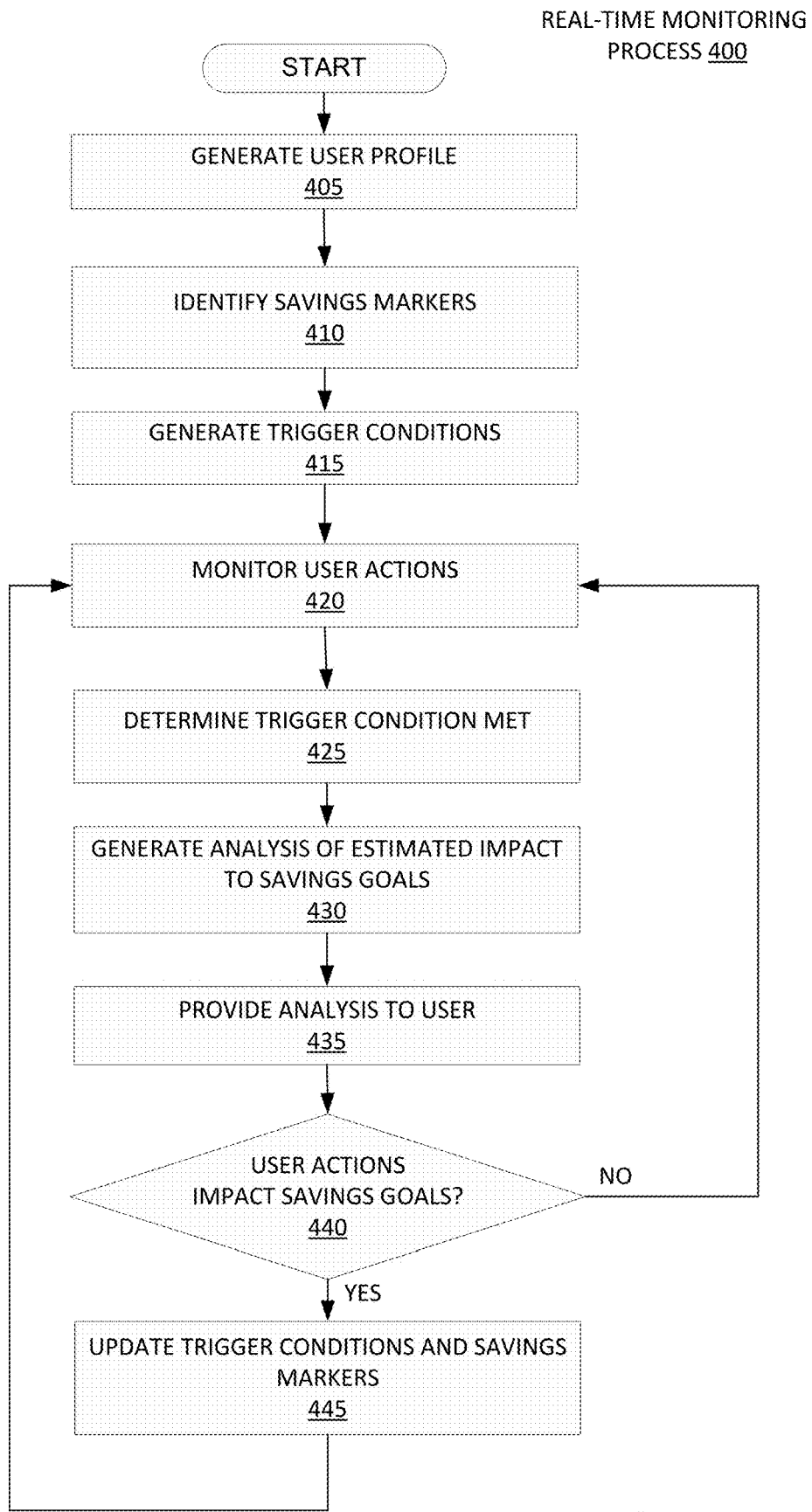
FIG. 4 is a flow chart of an exemplary real-time monitoring process, consistent with disclosed embodiments.

FIG. 4 shows a flowchart of an exemplary real-time monitoring of spending limits process 400, consistent with disclosed embodiments. According to some embodiments, process 400 may be employed to generate a user profile having savings goals for user 131, monitor actions of user 131 when in a retail environment, and provide user 131 with a spending analysis in time for user 131 to consider, before making a purchase, what impact purchasing a store item 123 would have on user 131 savings goals.

Figure 7:
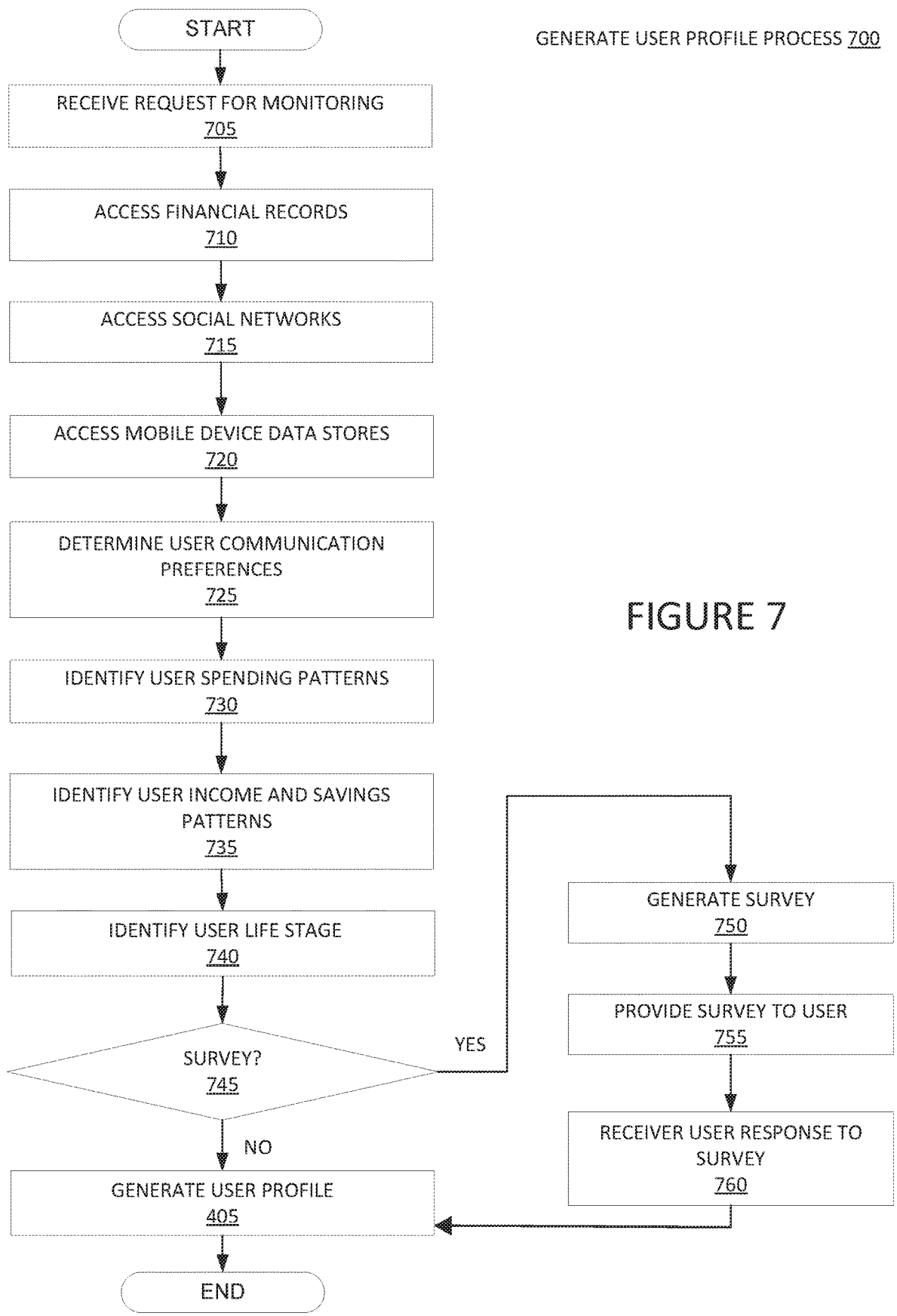
FIG. 7 is a flow chart of an exemplary user profile generation process, consistent with disclosed embodiments.

In step 405, FSP system 110 may generate a user profile for user 131, as described in more detail with respect to FIG. 7. At step 410, FSP system 110 may identify savings markers for user 131. For example, FSP system 110 may identify that user 131 saves $350 per month and takes one vacation per year that on average costs $4,000. In another example, FSP system 110 may receive input from user 131 (via, e.g., client device 130) identifying the savings markers.

At step 415, FSP system 110 may generate trigger conditions associated with the savings markers. For example, the trigger conditions may establish when to communicate with user 131 regarding one or more savings goals of the user. Thus, continuing the above example, a trigger condition may generated to send a message to user 131 when the user interacts with a store item whose purchase would cause user 131 to save less than $350 per month. Thus, if user 131 picks up an expensive item within a retailer environment, FSP system 110 may send a message to client device 130 informing the user 131 that purchasing the expensive item would cause user 131 to save only $250 that month if user 131 follows his or her typical spending patterns. In another example, a trigger condition may be generated when user 131 enters a retailer environment to communicate user 131's remaining budget for the category of spending most associated with the retailer's business. Thus, if user 131 enters a grocery store, FSP system 110 may send a message to client device 130 informing the user 131 that $50 remains in user 131 grocery budget until user 131's next pay period.

At step 420, FSP system 110 may monitor actions of user 131 via, e.g., communications received from merchant system 120. In some embodiments, merchant system 120 may include one or more hubs 124 monitoring the presence and location of a customer card 135 carried by user 131 and a plurality of product tags 128 affixed to store items within the retail environment associated with merchant system 120. For example, consistent with disclosed embodiments, hub(s) 124 may determine that user 131 entered the store, stood in front of a particular set of products for a predetermined amount of time, and/or interacted with the store item. Such determinations by hub(s) 124 may be forwarded to FSP system 110 (via, e.g., merchant server 122) for use in monitoring user 131's actions. Additionally or alternatively, FSP system may receive a communication from client device 130 (either directly or indirectly via, e.g., merchant server 122) indicating that user 131 operated client device 130 to scan a machine-readable code (e.g., barcode, QR code, etc.) affixed to the store item.

At step 425, FSP system 110 may determine that one or more trigger conditions associated with the user profile of user 131 are met by user 131's actions. For example, upon finding that user 131 entered a restaurant for a third time in one work week, FSP system 110 may determine a trigger condition has been met associated with a savings marker limiting user 131 to going out for lunch no more than two times per work week. In another example, upon finding that user 131 picked up a $500 product at a retailer store, FSP system 110 may determine a trigger condition has been met associated with a savings marker that excludes unbudgeted purchases over $300.

At step 430, FSP system 110 may generate an analysis of the estimated impact of user 131's actions on the savings goals of user 131. In some embodiments, such as when a trigger condition is met when user 131 walks into a retail store, the analysis may be the remaining budget available in the merchant category associated with the retail store. In other embodiments, such as when user 131 picks up an store item within the retail environment, the analysis may include a determination that the purchase of the store item picked up would meet a trigger condition, such as exceeding a spending limit indicated in savings markers associated with the user profile of user 131. FSP system 110 may further generate an analysis that includes suggested alternatives to the picked up store item, including alternative store items found within the same retail environment. In one example, the analysis may include a personalized cost metaphor comparing the cost of the store item picked up by user 131 to one or more regular expenses of the user. For example, if the user interacted with a power tool costing $400, FSP system 110 may generate an analysis that notes the purchase of the power tool equates to four months' worth of cable TV bills. In yet another example, the analysis could include suggestions for modifying the typical spending habits of user 131 to allow user 131 to purchase the picked up store item without impacting user 131's savings goals. For example, if user 131's spending habits include attending a baseball game three times per month at a cost of $30 per ticket, FSP system 110 may generate an analysis that reflects that user 131 may skip one month of baseball games in order to purchase a $90 pair of dress shoes whose purchase would otherwise exceed a spending limit.

In step 435, FSP system 110 may provide the analysis to user 131 in real-time. FSP system 110 may provide the analysis to user 131 by means of a push notification within a mobile device software application provided by the financial service entity associated with FSP system 110 installed on client device 130. Additionally or alternatively, FSP system 110 may provide the analysis via SMS message, e-mail, or any other real-time messaging system. In some embodiments, FSP system 110 may access the user profile of user 131 to identify user 131's communication preferences and provide the analysis according to the user 131's preferred method.

At step 440, FSP system 110 may determine whether the user's actions (including, e.g., actions occurring after the determination that user 131's actions met a trigger condition) will impact user 131's savings goals. For example, FSP system 110 may determine that user 131 made a purchase, which may reduce the budget available according to one or more spending goals of user 131. In another embodiment, FSP system 110 may find that user 131 returned a store item to the shelf without purchasing it, thus having no impact on the savings goals of user 131. When FSP system 110 determines the actions of user 131 do not impact the savings goals of user 131 (step 440; NO), FSP system 110 may continue to monitor actions of user 131 via, e.g., communications received from merchant system 120. When FSP system 110 determines the actions of user 131 do impact the savings goals of user 131 (step 440; YES), FSP system 110 may continue to step 445.

At step 445, FSP system 110 may update trigger conditions and savings markers based on the action taken. For example, FSP system 110 may reduce the remaining budget available for groceries when user 131 purchases groceries. FSP system 110 may determine that user 131 has made a purchase by authorizing a financial transaction requested by merchant system 120 to fund a purchase of one or more store items from user 131's financial account with the financial service entity. Additionally or alternatively, FSP system 110 may determine that user 131 has made a purchase when merchant system 120 communicates with FSP system 110 that payment terminal 126 processed the purchase of one or more store items by user 131. In other embodiments, FSP system 110 may determine that user 131 made a purchase despite receiving an analysis that the purchase exceeded certain speeding limits, and FSP system 110 may update one or more savings markers associated with user 131. For example, FSP system 110 may reduce the trigger conditions (e.g., remaining budget) associated with a second set of spending categories to account for user 131's purchase of an item that exceeded the budget for a first spending category or categories. In another example, FSP system 110 may update a savings marker when user 131 purchases an item for which the savings marker was set. For example, FSP system 110 may remove a savings marker associated with a vehicle after user 131 meets the savings marker and/or purchases a vehicle.

Figure 5:
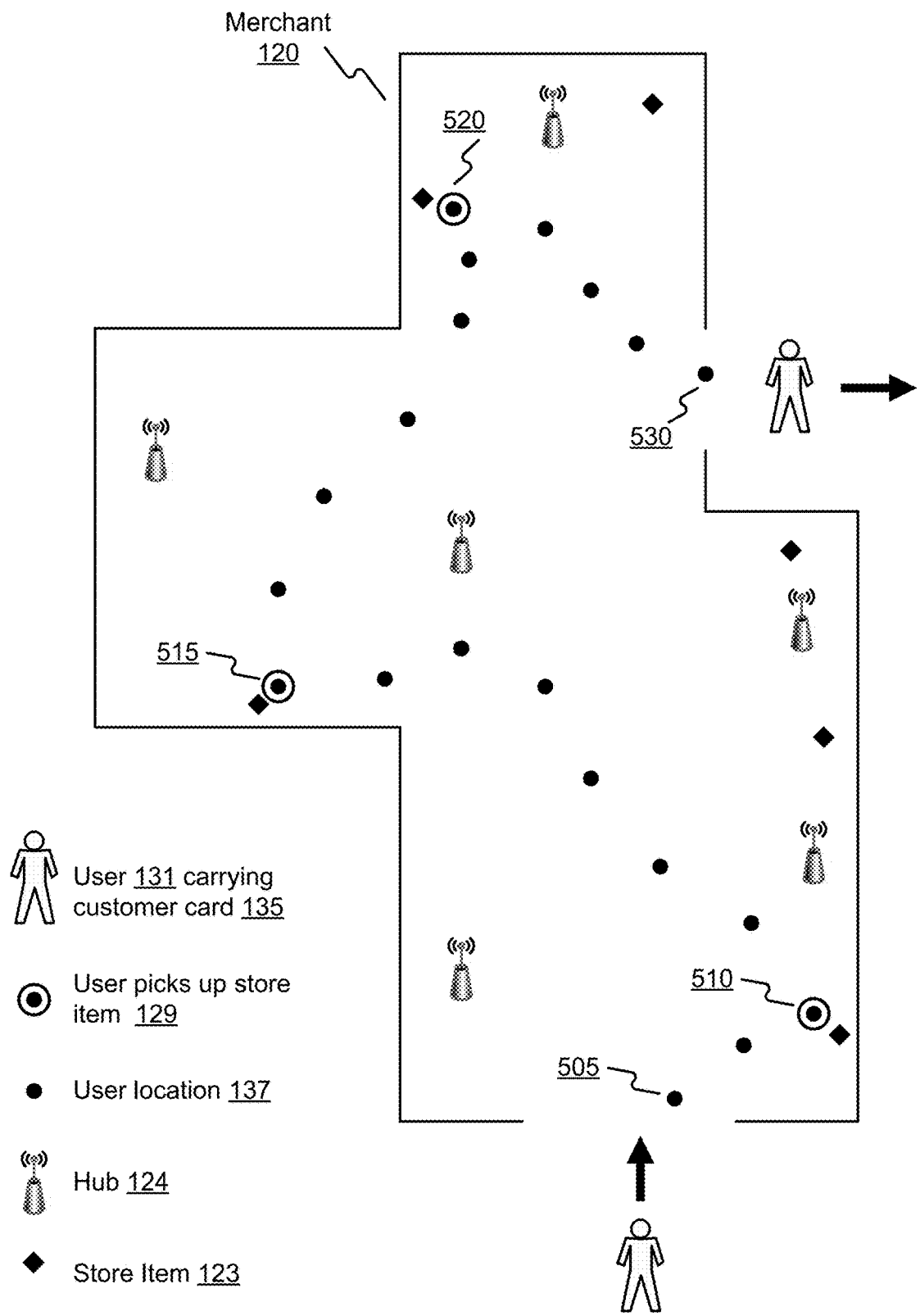
FIG. 5 is an exemplary retail environment, consistent with disclosed embodiments.

FIG. 5 is an exemplary retail environment, consistent with disclosed embodiments. Consistent with disclosed embodiments, one or more hubs 124 may detect that a user 131 has entered a retailer environment using in-store hub network 240 (event 505). Hub(s) 124 may communicate the event to FSP system 110 (via, e.g., merchant server 122 over network 140), which may perform operations further described with respect to FIG. 8.

Hub(s) 124 may further detect that a user 131 has stood in front of a particular set of products for a predetermined amount of time (event 510). In such an event, hub(s) 124 may determine that user 131 is considering whether or not to buy an item from the set of products and report the event to FSP system 110 consistent with disclosed embodiments along with information regarding the detected customer card and set of products. FSP system 110 may, in turn, provide user 131 with an analysis (via, e.g., client device 130) while user 131 remains in front of the set of products. The analysis may include, for example, an indication of customer review for each product in the set of products and/or a suggestion as to which product from the set of products would best fit user 131's savings goals. FSP system 110 may also provide an analysis as if the user had interacted with the set of products, which may include an analysis consistent with that described with respect to FIG. 9.

Hub(s) 124 may further detect that a user 131 has interacted with one or more store items 123 (events 515 and 520). Hub(s) 124 may communicate the event to FSP system 110 (via, e.g., merchant server 122 over network 140), which may perform operations further described with respect to, for example, FIG. 9. Finally, hub(s) 124 may detect that that user 131 has crossed a threshold near the entrance/exit of the retail environment (event 530) and cease monitoring customer card 135. According to some embodiments, hub(s) 124 may determine that user 131 was carrying one or more store items 123 when the customer exited the retailer environment (or entered a purchasing area of the retail environment). Upon detecting event 530, hub(s) 124 may communicate the event to FSP system 110 (via, e.g., merchant server 122 over network 140), which may conduct a corresponding financial transaction from an account of user 131 to fund the purchase of the one or more store items 123 carried out of the retailer environment by user 131.

Figure 6:
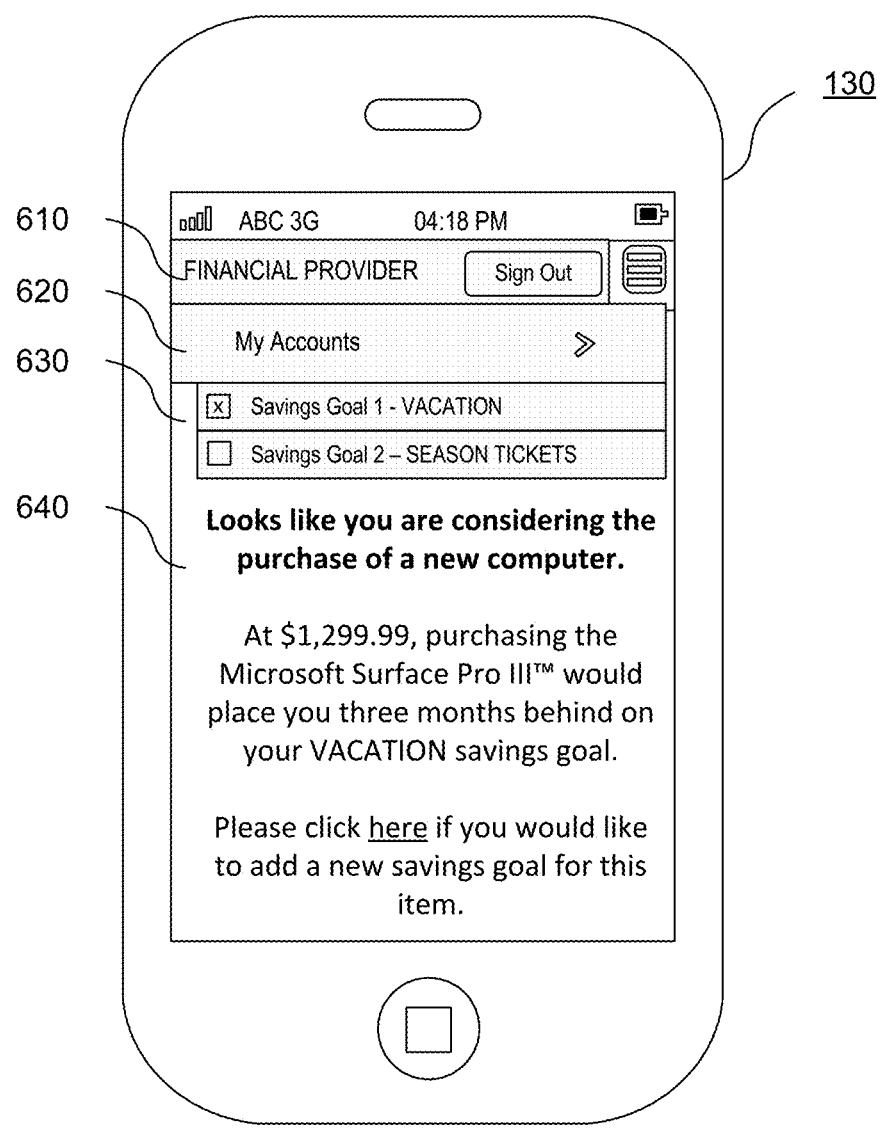
FIG. 6 is a diagram of an exemplary interface displaying an exemplary analysis on a client device, consistent with disclosed embodiments.

FIG. 6 is a diagram of an exemplary interface displaying an exemplary analysis on a client device, consistent with disclosed embodiments. FIG. 6 is a diagram of an exemplary client device 130 including an interface displaying an analysis provided by FSP system 110 consistent with disclosed embodiments. For example, client device 130 may include an interface (via, e.g., an app associated with financial service provider 110) that includes a graphical image identifying, for example, the financial service provider offering the real-time monitoring services (area 610), the financial service accounts registered for monitoring (area 620), and savings goals identified by FSP system 110 and/or entered by the user (area 630). Client device 130 may also include a message viewing area 640, which may display a message such as, for example, those described at step 435, 735, 820, and/or 930.

FIG. 7 is a flow chart of an exemplary user profile generation process, consistent with disclosed embodiments. At step 705, FSP system 110 may receive a request for real-time monitoring of user 131's spending habits (via, e.g., client device 130). FSP system 110 may receive the request directly (via, e.g., a website submission, e-mail, etc.) or indirectly (e.g., FSP system 110 may consider the downloading of an app for real-time monitoring as a request to begin monitoring user 131's spending patterns). FSP system 110 may also collect information from various sources reflecting user 131's demographics, spending and savings patterns, communication preferences, etc. For example, at step 710, FSP system 110 may access the financial records of user 131 at the financial service entity associated with FSP system 110, as well as any third-party financial service entities with whom user 131 holds an account. At step 715, FSP system 110 may access social network accounts associated with user 131 in order to, for example, collect various demographic information. In some embodiments, FSP system 110 may request and receive the necessary log in credentials from user 131 (via, e.g., client device 130) to access the financial and social network accounts of user 131. At step 720, FSP system 110 may access data stores associated with client device 130, including data stores not otherwise associated with an app for real-time monitoring (e.g., program(s) 324), if installed. Based at least on the information collected at steps 710-720, FSP system 110 may determine user 131's communication preferences (step 725), identify user 131's spending patterns (step 730), identify user 131's income and savings patterns (step 735), identify user 131's life stage (step 740), and/or derive any other characteristic of user 131 reflected in the accessed data. For example, FSP system 110 may determine from the accessed financial records that user 131 saves $350 per month and takes one vacation per year that on average costs $4,000. Thus, FSP system 110 may automatically identify savings marker(s) (see step 410) for user 131's annual vacation. FSP system 110 may also determine, for example, that user 131 spends roughly $75 at restaurants per week, pays $150 on cable TV per month, has a $1,750 monthly mortgage payment, etc. FSP system 110 may use this information to, for example, take into account user 131's typical spending patterns when providing an analysis estimating the impact of purchasing a store item on user 131's spending goals. FSP system 110 may further determine that user 131 prefers to communicate via certain channels, such as a social networking messaging system, SMS messaging, Skype™, etc., based on usage data accessed on client device 130, accessed social networks, etc.

At step 745, FSP system 110 may determine whether additional information is required or desirable for generating a user profile for user 131. If additional information is not required or desired (step 745; NO), FSP system 110 may generate a user profile for user 131 (see step 405). If additional information is required or desired (step 745; YES), FSP system 110 may generate a survey (e.g., a questionnaire) requesting the information required or desired. For example, if FSP system 110 could not identify any savings markers from the accessed financial data, FSP system 110 may generate a survey (step 750) requesting that the user 131 identify savings goals to include in the user profile of user 131. FSP system 110 may also provide the survey (step 755) to user 131 (via, e.g., client device 130) and receive a response (step 760) before generating the user profile for user 131 (see step 405).

Figure 8:
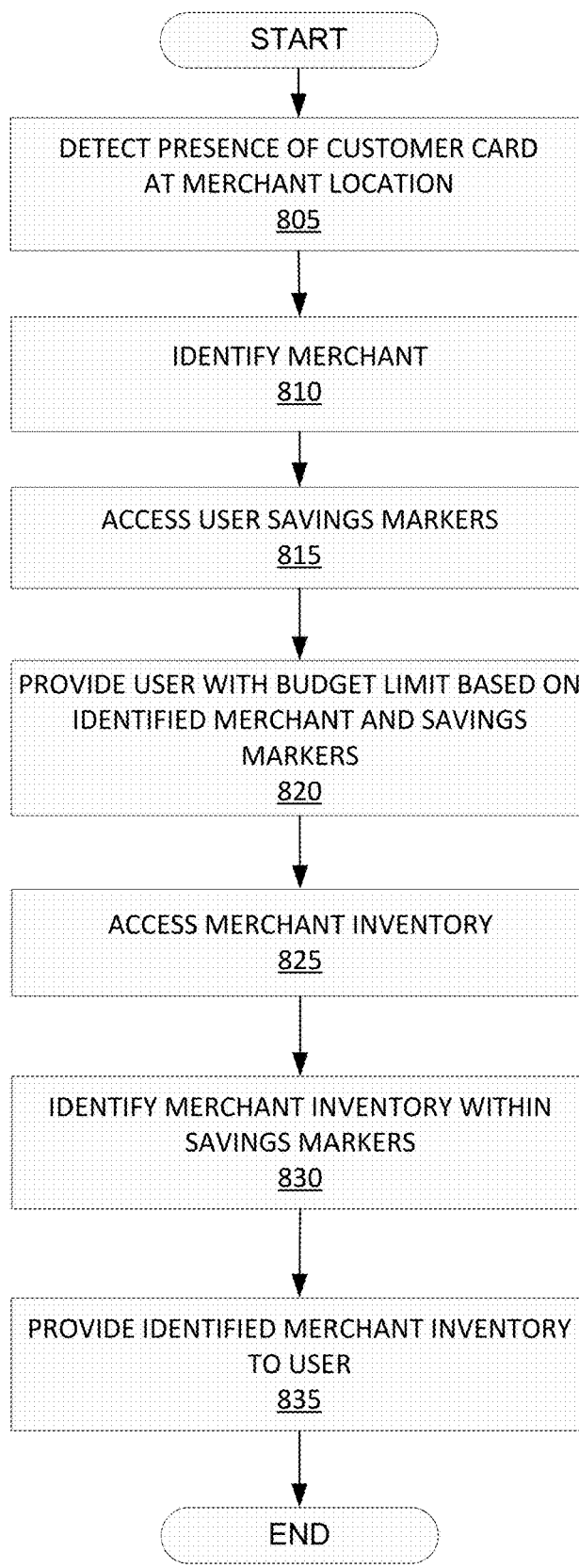
FIG. 8 is a flow chart of an exemplary user entering store monitoring process, consistent with disclosed embodiments.

FIG. 8 is a flow chart of an exemplary user entering store monitoring process, consistent with disclosed embodiments. At step 805, FSP system 110 may determine that user 131 has entered the retail environment of a merchant. For example, hub(s) 124 may detect the presence of a customer card 135 and communicate the event to FSP system 110 (via, e.g., merchant server 122 and network 140). As discussed, hub(s) 124 may communicate with and/or track the location of customer card 135 using an in-store hub network 240 generated by the one or more hubs 124. In-store network 240 may comprise near field communication (NFC), RFID, infrared, electric fields, magnetic fields, WiFi, Bluetooth, or any other suitable wireless technology suitable for performing operations consistent with disclosed embodiments. Hub(s) 124 may determine that user 131 has entered the store when customer card 135 enters in-store network 240. In one example, hub(s) 124 may determine that customer card 135 has entered in-store network 240 when customer card 135 accesses the network and begins communicating with hub(s) 124. In other examples, hub(s) 124 may generate an electrical field, and hub(s) 124 may determine customer card 135 has entered the in-store network 240 based on changes to the electrical field.

At step 810, FSP system 110 may identify the merchant. For example, FSP system 110 may communicate with merchant server 122 regarding the event in step 805 to obtain information identifying, among other things, the merchant name, location, merchant type, inventory listings, etc. FSP system 110 may also communicate with merchant server 122 to obtain information identifying the customer card 135 detected at step 805. FSP system 110 may then access the user profile of user 131 based on the identified customer card 135 to access, among other things, savings markers and trigger conditions associated with user 131 (step 815).

In one embodiment, the identified user profile may include a trigger condition for entering a retailer environment. For example, user 131's profile may include a trigger condition for providing user 131 with a budget limit upon entering a retailer environment. Thus, consistent with disclosed embodiments, FSP system 110 may provide user 131 with a budget limit based on, in one non-limiting example, one or more savings goals of user 131 and the merchant type of the retail environment entered. For example, user 131 may enter a grocery store, and at step 820, FSP system 110 may provide an analysis upon user 131 entering the retailer environment explaining that user 131's grocery budget has $90 remaining in it until user 131's next budgetary period (e.g., biweekly income payment or the like).

At step 825, FSP system 110 may access an inventory listing of the merchant associated with merchant system 120. In some embodiments, FSP system 110 may access data stores associated with merchant system 120. Additionally or alternatively, FSP system 110 may receive an inventory listing from merchant system 120 and/or store an inventory listing within the data stores of FSP system 110.

At step 830, FSP system 110 may identify merchant inventory items corresponding to savings markers of user 131. For example, FSP system 110 may determine that user 131 has a savings marker establishing a budget to make a $200 purchase of a particular store item, that user 131 saved $150 of the $200 purchase, and/or that the merchant is having a sale on that particular item such that user 131 can make the purchase while in the retailer environment without impacting any other budget constraints. Thus, at step 835, FSP system 110 may provide the identified merchant inventory information to the user (via, e.g., client device 130) explaining, for example, that the merchant is having a sale within the retail environment, and that user 131 can achieve a savings goal ahead of schedule (e.g., purchase the on-sale store item ahead of the budgeted schedule without violating any monetary budgeting constraints).

Figure 9:
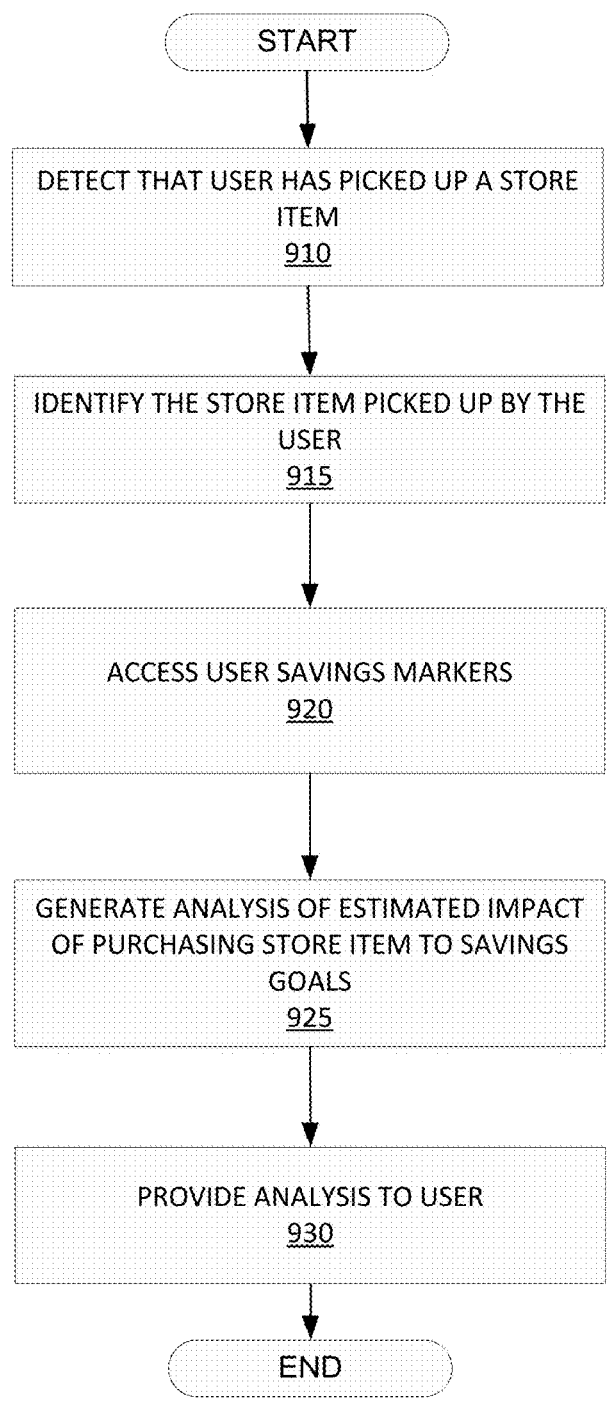
FIG. 9 is a flow chart of an exemplary user monitoring process, consistent with disclosed embodiments.

FIG. 9 is a flow chart of an exemplary user monitoring process, consistent with disclosed embodiments. At step 910, FSP system 110 may detect that user 131 has picked up a store item 123. For example, FSP system 110 may receive a communication from hub(s) 124 (via, e.g., merchant server 122 and network 140) that user 131 has picked up a particular store item 123 within the retail environment. As discussed, hub(s) 124 may communicate with and/or track the location of customer card 135 and product tags 128 over an in-store hub network 240 generated by the one or more hubs 124. In some embodiments, a user 131 picking up a particular store item 123 may trigger a sensor that may alert the hub(s) 124 that the store item 123 has been picked up, to trigger the monitoring of the user 131 by hub(s) 124. In-store network 240 may comprise near field communication (NFC), RFID, infrared, electric fields, magnetic fields, WiFi, Bluetooth, or any other wireless technology suitable for performing operations consistent with disclosed embodiments. Hub(s) 124 may determine that a customer has interacted with a store item 123 when customer card 135 and a product tag 128 become linked. In one example, hub(s) 124 may determine customer card 135 and a product tags 128 are linked based on a determination that customer card 135 and product tag 128 are within a predetermined proximity of each other. For example, hub(s) 124 may determine that customer card 135 and product tag 128 are within 10 inches of each other, indicating that the user has picked up store item 123. In other examples, hub(s) 124 may generate an electrical field, and hub(s) 124 may determine customer card 135 and product tag 128 are linked based on changes to the electrical field with respect to customer card 135 and store item 123 caused by user 131 touching store item 123. Additionally or alternatively, FSP system 110 may detect that user 131 has picked up a store item 123 based on a communication from client device 130 (either directly or indirectly via, e.g., merchant server 122) indicating that user 131 operated client device 130 to scan a machine-readable code (e.g., barcode, QR code, etc.) affixed to the store item.

At step 915, FSP system 110 may identify the store item 123 picked up by user 131. For example, in some embodiments, hub(s) 124 and/or merchant server 122 may provide identifying information associated with the picked-up store item 123 when reporting the event. In other embodiments, hub(s) 124 and/or merchant server 122 may provide all inventory information associated with the picked-up store item 123 when reporting the event. FSP system 110 may also communicate with merchant server 122 to obtain information identifying the customer card 135 associated with the picked-up item 123. FSP system 110 may then access the user profile of user 131 based on the identified customer card 135 to access, among other things, savings markers and trigger conditions associated with user 131 (step 920).

At step 925, FSP system 110 may generate an analysis of the estimated impact purchasing the picked-up store item 123 would have on user 131's savings goals. Consistent with disclosed embodiments, the analysis may include a determination that the purchase of the picked-up store item picked up would meet a trigger condition, such as exceeding a spending limit for one or more savings markers associated with the user profile of user 131. As discussed, FSP system 110 may further generate an analysis that includes suggested alternatives to the picked up store item, including alternative store items found within the same retail environment. In one example, the analysis may include a personalized cost metaphor comparing the cost of the store item picked up by user 131 to one or more regular expenses of the user. For example, if the user interacted with a business suit listed at $550, FSP system 110 may generate an analysis that notes the purchase of the power tool equates to three months' worth of cable TV bills. In yet another example, the analysis could include suggestions for modifying the typical spending habits of user 131 to allow user 131 to purchase the picked up store item without impacting user 131's savings goals. For example, if user 131's spending habits include attending a baseball game three times per month at a cost of $30 per ticket, FSP system 110 may generate an analysis explaining that user 131 may skip one month's worth of baseball games in order to purchase a $90 pair of dress shoes that would otherwise exceed a spending limit. At step 930, FSP system 110 may provide the analysis to the user as discussed above (see, e.g., step 435).

Figure 10:
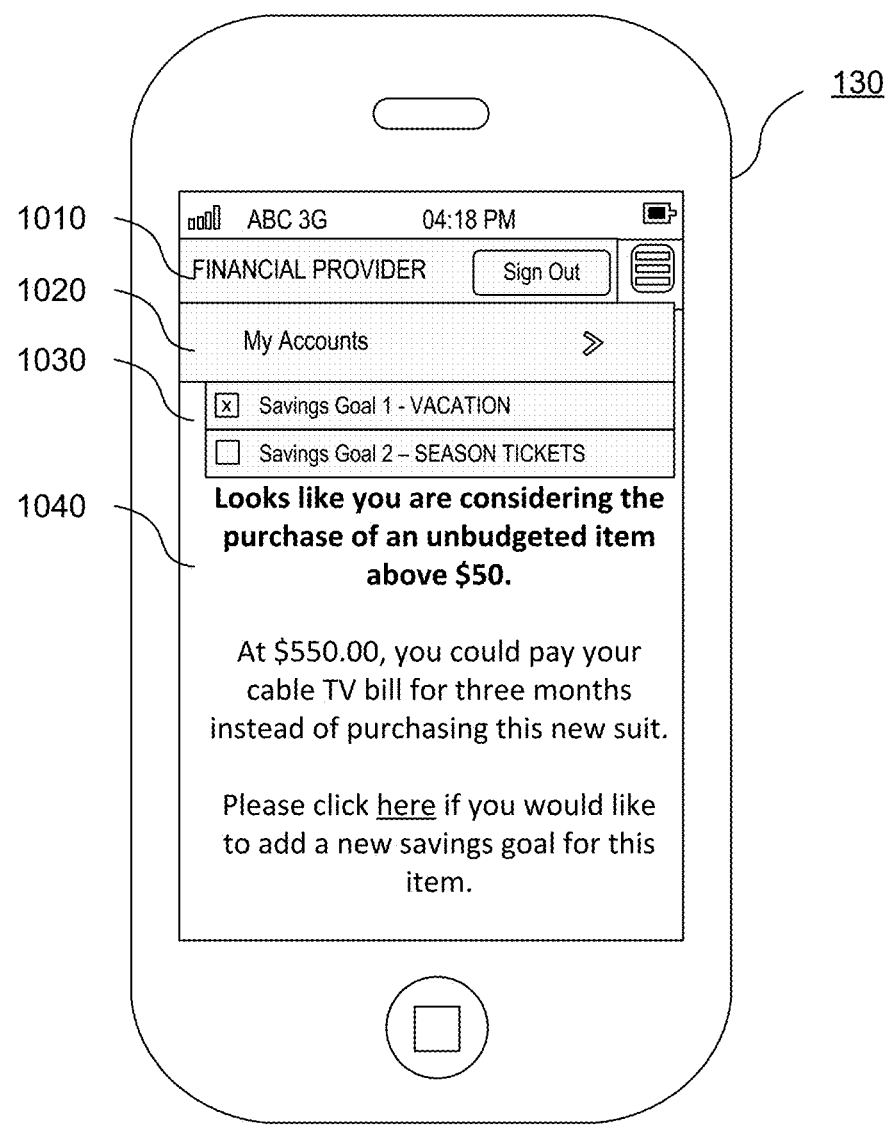
FIG. 10 is another diagram of an exemplary interface displaying an exemplary analysis on a client device, consistent with disclosed embodiments.

FIG. 10 is another diagram of an exemplary interface displaying an exemplary analysis on a client device, consistent with disclosed embodiments. For example, client device 130 may include an interface (via, e.g., an app associated with financial service provider 110) that includes a graphical image identifying, for example, the financial service provider offering the real-time monitoring services (area 1010), the financial service accounts has registered for monitoring (area 1020), and savings goals identified by FSP system 110 and/or entered by the user (area 1030). Client device 130 may also include a message viewing area 1040, which may display a message such as, for example, those described at step 435, 735, 820, and/or 930.

In some embodiments, two or more customer cards 135 may also become linked in the same or similar way described above with respect to the linking of customer card 135 and product tag 128. Customer cards 135 may become linked in order to, for example, add an additional level of accountability for one or both users 131 associated with the linked customer cards 135 to diligently pursue their respective savings goals. In one scenario, customer card 135a (not shown) of user 131a (not shown) may link to customer card 135b (not shown) of user 131b (not shown) when user 131a and user 131b interact with each other (e.g., shake hands, bump fists, or engage in any other behavior associated with social interaction). Once linked, customer card 135a and customer card 135b may exchange identifiers and/or hub(s) 124 may identify customer card 135a and customer card 135b in order to confirm (via, e.g., client device 130) that user 131a and user 131b wish to make a profile connection (not shown) allowing user 131a and user 131b to share user profile information with one another. Shared information may be viewable (via, e.g., client device 130) so long as a user 131 does not revoke the profile connection, regardless of whether customer cards 135 remain linked.

In some embodiments, the user profiles of user 131a and user 131b may include public and private profile components. Thus, upon a confirmation to share user profile information, user 131a and user 131 may be able to access the public components of each other's user profile via, e.g., client device 130. Private components may include, for example, financial account numbers, account access information, personal information, or any other sensitive personal and/or financial information. Public components may include savings goals, spending and savings activity, areas where user 131 wishes to improve spending/savings habits, etc. Thus, user 131a may view (via, e.g., client device 130) user 131b's progress in reaching user 131b's savings goals.

In some embodiments, FSP system 110 may compare the user profiles of user 131a and user 131b to determine similar, complementary, etc., traits between user 131a and user 131b. For example, FSP system 110 may determine that user 131a may have once indulged in impulse purchases that affected user 131a's savings goals, but user 131a has consistently met user 131a's savings goals for the past three years. In the other hand, FSP system 131 may determine that user 131b currently engages in impulse purchases that affect user 131b's savings goals. Thus, based on these determinations with respect to the spending habits of user 131a and user 131b, FSP system 110 may establish the profile connections as a mentor/mentee profile connection. In some embodiments, FSP system 110 may notify the mentor (via, e.g., client device 130) when, for example, the mentee has interacted with a store item that will negatively affect the mentee's savings goals, when the mentee has made timely deposits into savings, etc. FSP 110 may suggest the mentor contact the mentee to offer advice, encouragement, congratulations, etc., as the case may be.

In some embodiments, FSP system 110 may compare user profiles to determine, for example, that user 131a and user 131b are both saving towards a large purchase (e.g., vacations, mortgage down payment, vehicle purchase, etc.) or the same purchase. FSP system 110 may in such circumstances communicate with user 131a and user 131b (via, e.g., client device 130) to facilitate user 131a and user 131b making savings contributions at the same time, discussing each other's progress, suggesting user 131a and user 131b make match contributions, etc. In some embodiments, user 131a may contribute to the savings goal of user 131b, and vice versa.

In still other embodiments, FSP system 110 may establish a savings goal account for user 131. For example, the savings goal account may require a regular direct deposit and/or require the account remain locked (e.g., not available for withdraw) until the savings goal associated with the account has been reached. In some embodiments, the savings goal account may comprise a mutual fund, CD (certificate of deposit), stock, etc.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone. Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM.

Computer programs based on the written description and methods of this specification are within the skill of a software developer. The various programs or program modules can be created using a variety of programming techniques. For example, program sections or program modules can be designed in or by means of Java, C, C++, assembly language, or any such programming languages. One or more of such software sections or modules can be integrated into a computer system, computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

What is claimed is:

1. A system configured for providing real-time monitoring of savings goals, comprising:
   a memory storing software instructions, and
   one or more processors configured to execute the software instructions to perform operations comprising:
     establishing a user profile of a user on a financial service provider system, the user profile comprising:
       at least one savings goal comprising a plurality of trigger conditions associated with the at least one savings goal, the plurality of trigger conditions including a remaining budget associated with at least one user budget that includes a regular expense of the user;
     initiating communication between the financial service provider system and a merchant system that is in communication with an in-store hub network on the merchant system, the in-store hub network comprising a plurality of hubs physically located within a retail environment and a plurality of product tags affixed to store items within the retail environment;
     receiving at the financial service provider system from the merchant system, a communication indicating determination that a user has entered a retail environment detected by the in-store hub network;
     tracking the location of a customer card carried by the user via the merchant system by communication between the customer card and the in-store hub network, the customer card being a financial card;
     receiving, at the financial service provider system from the merchant system, a communication over a secondary network indicating detection by at least one hub among the plurality of hubs of a location of the customer card and a location of a plurality of product tags affixed to store items within the retail environment, each hub of the in-store hub network tracking a location of the customer card and product tags;

receiving, at the financial service provider system from the merchant system and from the at least one hub, a communication over the secondary network indicating detection, from the in-store hub network of the location of the customer card and plurality of product tags;

determining that the customer card and the at least one product tag are within a predetermined proximity of each other based on changes to an electric field generated by the at least one hub, the changes to the electric field caused by the customer card and at least one product tag;

receiving a communication over the secondary network from the merchant system at the financial service provider system indicating that the customer card and at least one of the product tags are linked based on the determination that the customer card and the at least one product tag are within the predetermined proximity of each other;

determining by the financial service provider system that the user has interacted with a store item associated with the at least one product tag within a retail environment based on the received communication that the customer card and at least one of the product tags are linked;

accessing the user profile;

determining that a purchase of the store item would meet at least one trigger condition from among a plurality of trigger conditions by exceeding the remaining budget associated with the at least one user budget;

generating, on the financial service provider system, a real-time analysis of an estimated impact of the purchase on the at least one user budget, the analysis comprising a personalized cost metaphor, the personalized cost metaphor comparing a cost of the store item to the at least one regular expense of the user and the remaining budget, the real-time analysis including a suggested modification to a typical spending habit of the user that allows the user to purchase the store item without impacting the at least one user budget; and providing the analysis from the financial service provider system to a client device for display to the user in real-time while the user remains within the retail environment.

2. The system of claim 1, wherein the customer card and the product tags are battery-less.

3. The system of claim 1, wherein the operations further comprise providing the real-time analysis over the secondary network to the user while the user remains within the retail environment by using at least one of a push notification, an SMS message, or an e-mail.

4. The system of claim 3, wherein the operations further comprise providing the real-time analysis over the secondary network to the client device while the user interacts with the store item.

5. The system of claim 1, wherein the operations further comprise:
determining that the user initiated a financial transaction to purchase the store item; and
updating the trigger conditions based on the determination that the user initiated the financial transaction.

6. The system of claim 5, wherein the operations further comprise sending instructions from the financial service provider system to the client device over the secondary network to update the trigger conditions by lowering the remaining budget to meet one of the at least one savings goal based on the determination that the user initiated the financial transaction.

7. The system of claim 5, wherein the operations further comprise prompting the user to add, to the user profile, an additional savings goal associated with the store item when purchase of the store item would exceed the remaining budget.

8. The system of claim 1, wherein the operations further comprise:
accessing an inventory of store items within the retail environment; and
providing the user budget to the client device based on the at least one savings goal.

9. The system of claim 1, wherein the operations further comprise:
accessing financial records of the user from the financial service provider system; and
generating the user profile on the financial service provider system based on at least the accessed financial records.

10. The system of claim 9, wherein the operations further comprise:
identifying savings practices of the user based on at least the accessed financial records;
identifying spending practices of the user based on at least the accessed financial records;
configuring the at least one savings goal of the user based on the identified savings practices and the identified spending practices; and
generating the trigger conditions associated with the at least one savings goal.

11. The system of claim 1, wherein the operations further comprise:
identifying additional information needed to generate the user profile;
providing a user profile survey to the client device requesting the additional information; and
configuring the at least one savings goal of the user based on at least a response to the user profile survey.

12. The system of claim 1, wherein the operations comprise:
accessing, by the financial service provider system, a social network account of the user; and
generating, by the financial service provider system, the user profile based on at least the accessed social network account of the user.

13. The system of claim 1, wherein the operations further comprise:
receiving, at the financial service provider system, usage data for the client device;
identifying communication preferences of the user based on at least the received usage data; and
generating, by the financial service provider system, the user profile based on at least the identified communication preferences.

14. The system of claim 13, wherein the operations further comprise providing the analysis over the secondary network to the client device according to the identified communication preferences.

* * * * *